United States Patent

Siemens

[11] Patent Number: 5,167,318
[45] Date of Patent: Dec. 1, 1992

[54] REMOVABLE POWER SWEEP

[76] Inventor: William D. Siemens, R.R. #2, Beausejour, Manitoba, Canada, R0E 0C0

[21] Appl. No.: 698,977
[22] Filed: May 13, 1991

[30] Foreign Application Priority Data

Apr. 30, 1991 [CA] Canada ................. 2041523

[51] Int. Cl.5 ......................... B65G 33/32
[52] U.S. Cl. .................. 198/550.01; 198/550.1; 414/310; 414/311
[58] Field of Search ............ 198/550.01, 550.1, 550.6, 198/666; 414/310, 311, 312

[56] References Cited

U.S. PATENT DOCUMENTS

| | | | |
|---|---|---|---|
| 3,434,605 | 3/1969 | Yung | 414/311 X |
| 3,536,210 | 10/1970 | Dickinson | 414/310 |
| 3,765,548 | 10/1973 | Shivvers | 414/310 |
| 4,008,816 | 2/1977 | Harrison | 414/310 |
| 4,029,219 | 6/1977 | Rutten et al. | 414/310 X |
| 4,103,788 | 8/1978 | Sutton | 414/312 X |
| 4,583,903 | 4/1986 | Hutchison | 414/311 |
| 4,585,385 | 4/1986 | Buschbom et al. | 414/311 |
| 4,875,820 | 10/1989 | Lepp et al. | 414/310 X |

Primary Examiner—Robert P. Olszewski
Assistant Examiner—James R. Bidwell
Attorney, Agent, or Firm—Murray E. Thrift; Adrian D. Battison; Stanley G. Ade

[57] ABSTRACT

A bin clean-out system for circular grain bins having flat floors includes an in-floor auger with a central inlet and an outlet outside of the bin. A bin sweep is connected to the in-floor auger by two right angled gear drives and a splined connection between the two. Driving the in-floor auger with an external motor and drives both the auger and the bin sweep. The bin sweep can be lifted from the in-floor auger and transported to another bin as desired.

9 Claims, 3 Drawing Sheets

REMOVABLE POWER SWEEP

FIELD OF THE INVENTION

The present invention relates to bin clean-out systems and more particularly to a clean-out system with a lift out bin sweep.

BACKGROUND

One particularly effective system for unloading grain bins is an unloading auger installed under the floor of the bin for drawing grain from openings in the floor of the bin to a discharge outside the bin. Such an auger may be associated with a sweep for cleaning out the grain that will not fall into the grain openings under gravity. The bin sweep is an auger that lies along the floor and draws grain into the grain opening in the floor. A sweep of this sort is conventionally hydraulically or electrically driven and requires the undesireable use of hydraulic hoses or electric cords in the bin. There is also a significant cost involved in acquiring complete unloader and sweep systems for a number of bins.

The present invention has for its objective the provision of an improved grain bin clean-out system.

SUMMARY

According to one aspect of the present invention there is provided, in a bin clean-out system for a bin with a floor, said system having an in-floor auger leading from a central grain inlet in the floor to an outlet outside the bin, a sweep rotatable in the bin about the central grain inlet for drawing grain across the floor to the inlet, sweep drive means for driving the sweep and drive means connected to the in-floor auger for driving the in-floor auger, the improvement wherein the sweep drive means includes first and second coupling components carried by the in-floor auger and the bin sweep respectively, with the coupling components being engageable to provide a driving connection from the in-floor auger to the bin sweep and being disengageable in response to upwards movement of the bin sweep so as to release the bin sweep from the in-floor auger.

According to another aspect of the present invention there is provided, in a grain bin having a circular floor with a flat floor surface, a clean-out system comprising:

an auger in the floor, below the floor surface and extending from a central grain inlet in the floor to an outlet outside the bin;

drive means operatively coupled to the auger outside the bin for driving the auger to draw grain from the inlet to the outlet;

first gear drive means operatively coupled to the auger at the grain inlet and driven thereby, the first gear drive means having an upright output;

second gear drive means at the grain inlet, positioned above the first gear drive means, with an input substantially aligned with the output of the first gear drive means and a lateral output;

a spline coupling separably joining the output of the first gear drive means to the input of the second gear drive means such that the second gear drive means is driven by the first gear drive means and may be lifted out of driven engagement with the first gear drive means;

a bin sweep including sweep flighting operatively coupled to the second gear drive means to be driven thereby, and a sweep drive means coupled to the sweep and driven by rotation thereof to drive the sweep over the floor, around the centre of the floor.

The sweep is this driven directly from the in-floor auger so that no motor is required in the bin. Electric cords and hydraulic hoses are not required. The sweep is easily removed for transfer from bin to bin, so that a single sweep can effectively be used with several bins at minimal cost.

BRIEF DESCRIPTION OF THE DRAWINGS

In the accompanying drawings, which illustrate an exemplary embodiment of the present invention.

DETAILED DESCRIPTION

Figure 1:
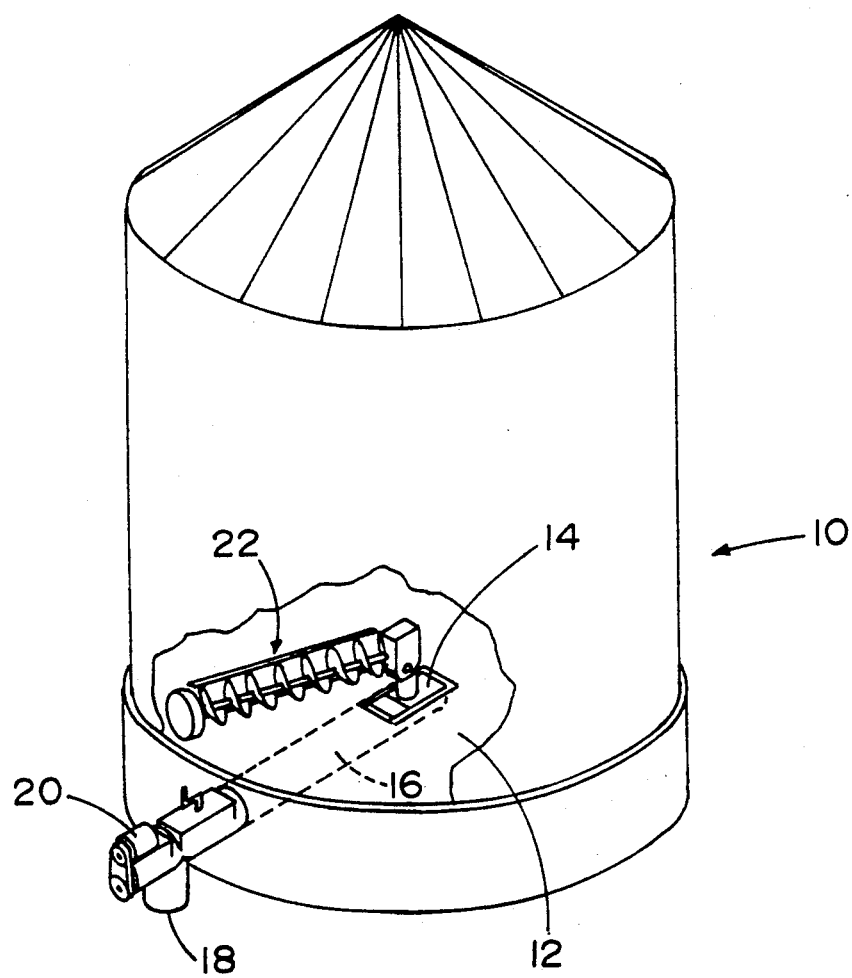
FIG. 1 is an isometric view, partially broken away of a bin equipped with a clean-out system according to the present invention.

Referring to the accompanying drawings, and especially to FIG. 1, there is illustrated a grain bin 10 having a circular, flat floor 12. In the centre of the floor is a grain inlet 14 which is a rectangular opening in the floor leading to an in-floor auger 16. The auger has an outlet 18 outside of the bin for discharging the grain from the bin. The auger is driven by an external motor 20 adjacent the outlet 18. Within the bin, extending from the grain inlet 14 radially to the wall of the bin is a bin sweep 22. When driven, this device rotates around the centre of the bin and draws grain from the floor of the bin to the centre inlet.

Figure 2:
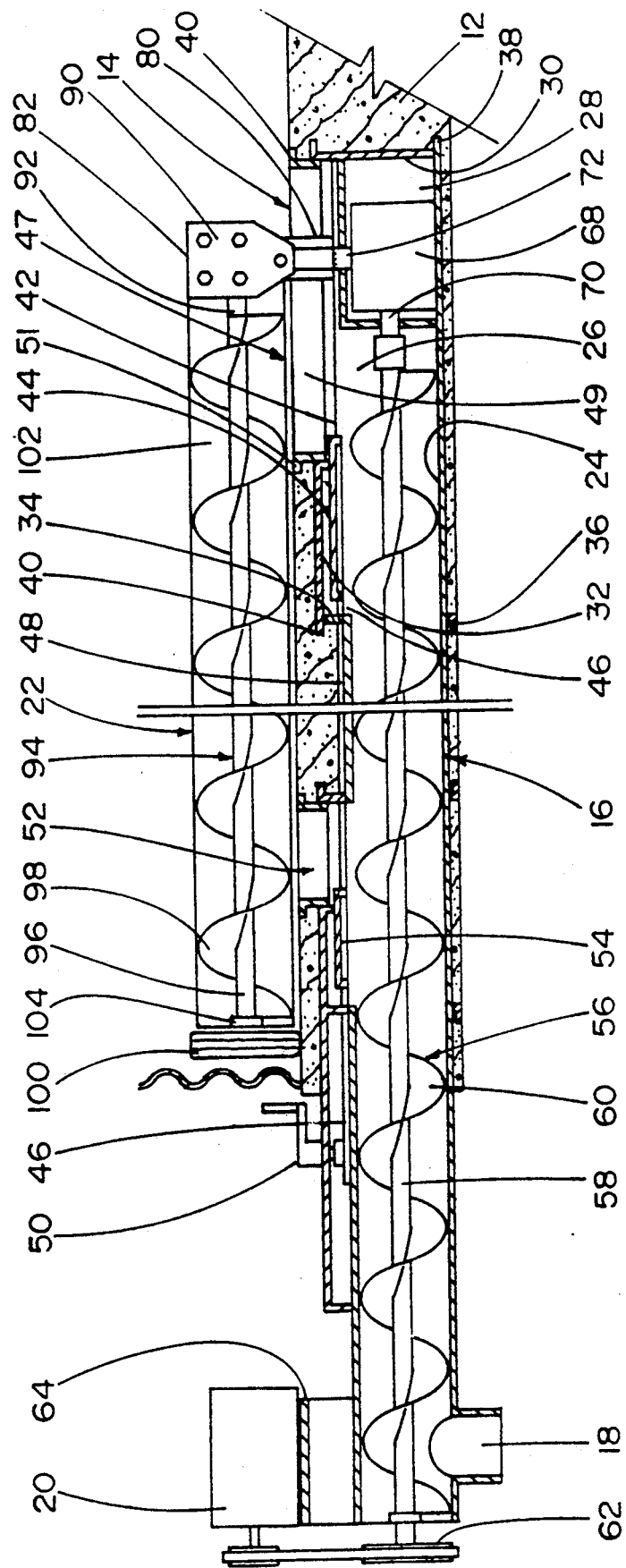
FIG. 2 is a sectional elevation of the clean-out system.
Figure 3:
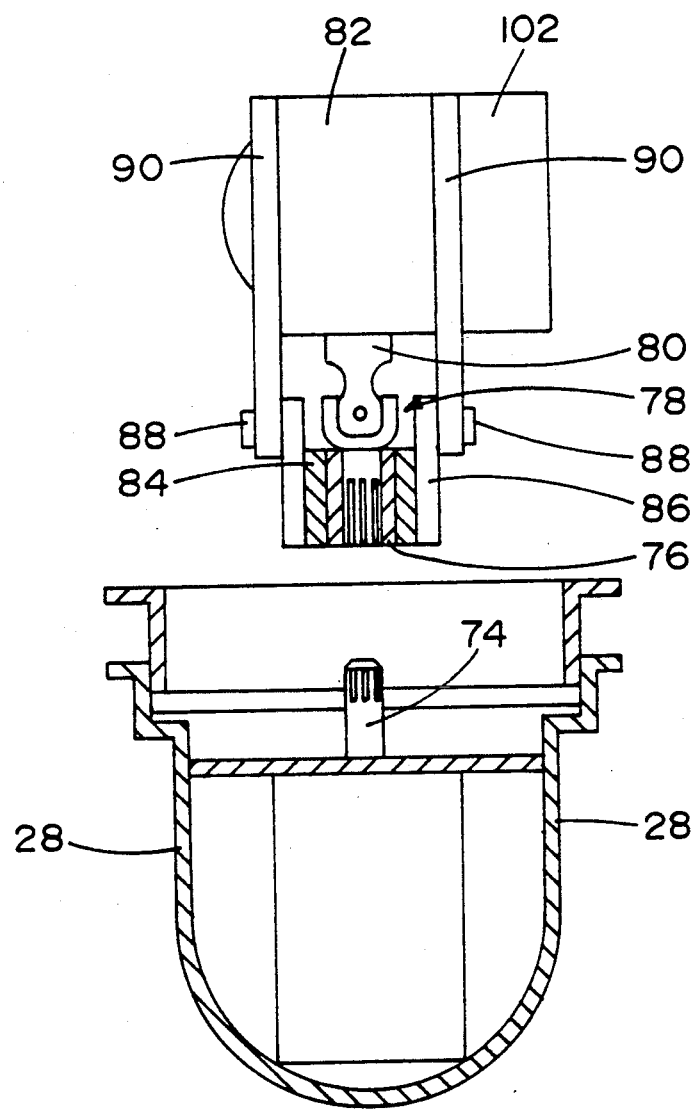
FIG. 3 is an end elevation, partially in section, of the clean-out system, showing the sweep removed.

As illustrated most particularly in FIGS. 2 and 3, the auger 16 includes an auger tube 24 embedded in the concrete floor of the bin. At the centre of the bin, the tube has an inlet chamber 26 that includes two parallel side walls 28 and an end wall 30 closing off the end of the auger tube 24. At the end opposite end wall 30, the inlet chamber is covered by a partial top wall 32 and bounded by an end flange 34. The flange 34 has a narrow, horizontal support flange 36. A similar support flange 38 is provided on the end wall 30.

Around the top of the inlet chamber 26, the side walls, the end wall and the end flange are formed into a peripheral, outwardly directed top flange 40 that keys into the concrete of the bin floor. Below the flange 40, the side walls 28 are formed into horizontal steps 42 to support a gate 44 that slides across the top of the inlet chamber 26 on the steps when driven by a rod 46. The gate 44 has a retracted position beneath the top wall 32 and a closed position extending fully across the open top of the inlet chamber 26.

The rod 46 that operates the gate 44 extends along the top of the auger tube 24 and itself runs in a small diameter tube 48 serving as a rod housing. At the outer end, the rod is equipped with a rack and is driven by a pinion carried on a crank 50.

An inlet frame 47 has a rectangular wall 49 that fits telescopically into the top of chamber 26. At its upper end the frame has an outwardly directed flange 51 that seats on the top of the concrete floor.

In the illustrated embodiment, the auger tube 16 has a second inlet 52 near the bin wall. This inlet is of similar construction to the centre inlet 26 and may be closed by a gate 54 driven by the rod 46.

The auger tube 16 carries an auger screw 56 with a core 58 and flighting 60. At the outer end of the auger, the core extends through the end of the auger tube beyond the outlet 18 and is connected to a drive pulley 62. Above the outlet, the tube carries a motor support 64 on which the motor 20 is mounted.

At the inner end of the auger 56 is a right angled gear drive 68 with an input 70 connected to the auger core 58 and an upright output 72 in the centre of the inlet chamber 26. The output is in the form of a splined shaft 74 that engages in a splined collar 76. The collar is connected to a universal joint 78 that is in turn connected to the input 80 of a gear drive 82. The collar 76 rotates in a bushing 84 carried by a support tube 86. The support tube is mounted by two pivots 88 on a pair of side plates 90 carried by the gear drive 82. The pivots 88 are aligned with the U-joint 78, so that the splined collar will swing as a pendulum about the pivots 88. This ensures that the collar hangs plumb from the gear drive 82, so that it can easily be lowered onto or lifted off the splined shaft 74.

The gear drive 82 has a horizontal output 92 that drives a sweep screw 94 of bin sweep 22. The screw has a core 96 connected to the gear drive output and flighting 98. At the outer end of the sweep, adjacent the bin wall, the core carries a wheel 100 that supports the sweep on the bin floor and revolves the sweep around the axis of the splined coupling as the sweep screw is rotated. The bin sweep also includes a blade 102 that is located on the back side of the screw. The inner end of the blade is fixed to the housing of the gear drive 82, while the outer end is supported on the core 96 of the sweep screw by a bearing 104.

In use, the pivoting coupling above the spline allows the sweep to operate at other than a right angle to the output shaft of the gear drive 68. This accommodates installation misalignments and allows the sweep to ride over some minor obstructions that may be encountered.

To operate the clean-out system, the gates 44 and 54 are opened using the hand crank 50. This allows grain to fall under gravity into the two inlets. The motor 20 is then operated to drive the auger 16 to draw grain from the two inlets to the outlet 18.

The bin sweep, driven by the in-floor auger, revolves about the splined coupling between the two gear drives, driven by the wheel 100. The flighting on the sweep draws grain across the floor into the inlet chamber 26. When a bin is empty and it is desired to unload another bin, the sweep may be removed and transferred to the other bin after the bulk of the grain has been unloaded by gravity feed into the inlet to the in-floor auger.

While one embodiment of the present invention has been described in the foregoing, it is to be understood that other embodiments are possible within the scope of the invention. The invention is to be considered limited solely by the scope of the appended claims.

I claim:

1. In a grain bin having a circular floor with a flat floor surface, a clean-out system comprising:
    an auger in the floor, below the floor surface and extending from a central grain inlet in the floor to an outlet outside the bin;
    drive means operatively coupled to the auger outside the bin for driving the auger to draw grain from the inlet to the outlet;
    first gear drive means operatively coupled to the auger at the grain inlet and driven thereby, the first gear drive means having an upright output;
    second gear drive means at the grain inlet, positioned above the first gear drive means, with an input substantially aligned with the output of the first gear drive means and a lateral output;
    a universal joint coupled to the input of the second gear drive means;
    a spline coupling separably joining the output of the first gear drive means to the universal joint such that the second gear drive means is driven by the first gear drive means and may be lifted out of driven engagement with the first gear drive means;
    a bin sweep including sweep flighting operatively coupled to the second gear drive means to be driven thereby, and a sweep drive means coupled to the sweep and driven by rotation thereof to drive the sweep over the floor, around the centre of the floor.

2. A grain bin according to claim 1 including a universal joint joining the splined coupling and the input of the second gear drive means.

3. A grain bin according to claim 2 wherein the splined coupling comprises a splined output shaft of the first gear drive means and a mating splined collar coupled to the input of the second gear drive means.

4. A grain bin according to claim 3 including bushing means supporting the splined collar.

5. A grain bin according to claim 4 including support means supporting the bushing means from the second gear drive means, the support means including pivot means mounting the bushing for pivotal movement about a horizontal axis transverse to the sweep and aligned with the universal joint.

6. In a bin clean-out system for a bin with a floor, said system having an in-floor auger leading from a central grain inlet in the floor to an outlet outside the bin, a sweep rotatable in the bin about the central grain inlet, sweep drive means for driving the sweep and auger drive means connected to the in-floor auger for driving the in-floor auger, the sweep drive means including
    a first gear box with an input coupled to the in-floor auger and an upright output;
    a second gear box positioned above the first gear box with a depending input and an output coupled to the sweep;
    first and second coupling components comprising a splined coupled between the output of the first gear box and the input of the second gear box, with the coupling components being engageable to provide a driving connection from the in-floor auger to the bin sweep and being disengageable in response to upwards movement of the bin sweep so as to release the bin sweep from the in-floor auger; and
    a universal joint between the splined coupling and the input of the second gear box.

7. A clean-out system according to claim 6 wherein the splined coupling comprises a splined output shaft of the first gear box and a mating splined collar coupled to the input of the second gear box.

8. A clean-out system according to claim 7 including bushing means supporting the splined collar.

9. A clean-out system according to claim 8 including support means supporting the bushing means from the second gear box, the support means including pivot means mounting the bushing for pivotal movement about a horizontal axis transverse to the sweep and aligned with the universal joint.

* * * * *